United States Patent [19]

Susin

[11] Patent Number: 4,483,371

[45] Date of Patent: Nov. 20, 1984

[54] PROTECTIVE HOLDER FOR HOSE TIP ASSEMBLY

[76] Inventor: Victor G. Susin, 9S252 Naper Blvd., Naperville, Ill. 60565

[21] Appl. No.: 516,317

[22] Filed: Jul. 22, 1983

[51] Int. Cl.³ .................... F16L 55/24; F16L 57/00
[52] U.S. Cl. ................................ 138/89.4; 138/89; 138/89.2; 138/96 R
[58] Field of Search ............. 138/89, 89.1, 89.2, 138/89.3, 89.4, 96 R, 90, 96 T; 24/217 W, 326

[56] References Cited

U.S. PATENT DOCUMENTS

| | | | |
|---|---|---|---|
| 1,307,947 | 6/1919 | Williams | 138/89.2 |
| 1,330,577 | 2/1920 | Bloom | 138/89.4 |
| 1,473,032 | 11/1923 | Freedlander | 138/96 R |
| 1,493,764 | 5/1924 | Palmer et al. | 138/89.4 |
| 2,379,529 | 7/1945 | Kennedy | 138/96 R X |
| 2,672,160 | 3/1954 | Wrobel | 138/89.2 |
| 2,899,483 | 8/1959 | Robertson et al. | 138/96 R |
| 4,146,180 | 3/1979 | Frosch et al. | 138/96 R X |
| 4,326,569 | 4/1982 | Vaillancourt | 138/89 X |
| 4,329,857 | 5/1982 | Kittle et al. | 138/89 X |
| 4,395,800 | 8/1983 | Shindellar | 138/89 |

Primary Examiner—James E. Bryant, III
Attorney, Agent, or Firm—William Lohff

[57] ABSTRACT

A resilient protective holder molded of rubber for storing a hydraulic hose tip assembly having a ball operated check valve with tapered sealing surfaces adjacent the ball, the holder including a hollow interior with first and second chambers, an entry end permitting access to the interior but having a dust shield in a normally closed position over the opening but moveably inwardly by insertion of the assembly, and a closed end opposite the entry end. The interior surfaces provide a tapered stop isolating chambers. The chambers are adapted for engagement with the sealing surfaces of the check valve. A plurality gripping surfaces are in the second chamber for releaseably gripping the assembly. The dust shield has a plurality of radial slits from a center forming a plurality of flexible fingers.

10 Claims, 3 Drawing Figures

PROTECTIVE HOLDER FOR HOSE TIP ASSEMBLY

BACKGROUND OF THE INVENTION

This invention relates to protective holders for hose tip assemblies and more particularly to a resilient protective holder for hose tip assemblies associated with hydraulic power systems.

Hydraulic power systems for farm equipment frequently use mating coupling members to interconnect hydraulic lines from tractors to farm implements for the transfer of power. The coupling members permit the connection of any of a variety of implements as each is needed for a particular purpose. Generally, the male coupling member is at the forward end of a hydraulic hose on or about the tongue section of the implement and includes a valve, usually a check valve, as part of the hose tip assembly.

When hose tip assemblies are not connected, they are exposed to a variety of conditions which may cause damage to the ball or sealing surfaces on the check valve or may contaminate the hydraulic fluid with dirt or other material. Frequently, the ends of the hoses when unconnected are not secured to the implement and may loosely extend downwardly towards the ground. During transportation of an implement, the hoses also may be left unconnected and be exposed to impact from striking various implement surfaces or the ground.

It is of particular importance to provide protection to the ball, sealing surfaces of the check valve and associated parts of the hose tip assembly since damage to these parts may prevent effective use of the hydraulic power system. Further damage to or movement of the ball may permit dirt or other material to contaminate the hydraulic fluid and interfere with the operation of the control valve and other parts.

In the past, simple plastic covers have been snapped over the ball for protection. However, leakage of small amounts of hydraulic fluid past the ball has resulted in the oil reaching the cover retaining surfaces and causing the cover to slip off the valve. Further, these covers have not in general provided a close fit with the sealing surfaces and have not prevented dirt and other materials from reaching those surfaces and causing erosion and other harmful effects.

Accordingly, one object of the invention is a protective holder or cover for hose tip assemblies utilized on hydraulic power systems for farm and other equipment. Another object of the invention is a protective holder which limits access of any leakage fluid from reaching those surfaces of the holder that retain the holder on the hose tip assembly. A further object of the invention is a protective holder which may be mounted on a supporting surface of an implement, tractor or the like. It is also an object of this invention to provide a protective holder with limited access to its interior by dirt or other material. These and other objects will become apparent from the following description.

SUMMARY

Briefly, the invention is directed to a protective holder preferably molded from rubber or other resilient material, with a hollow interior, and having an entry end with a dust shield in a normally closed position but moveable inwardly in a longitudinal direction to permit entry of the hose tip assembly. An opposite or valve end is also provided with a closure. Intermediate the ends in the tubular interior is provided a plurality of resilient gripping surfaces for releaseably gripping outer surfaces of the hose tip assembly. A resilient stop member is provided adjacent the end closure with preferably tapered surfaces to provide a resilient cushion adjacent the sealing surfaces of the check valve. A small chamber for the ball is also provided with a drain hole to permit drainage of any leakage fluid from the ball. The cushion further provides isolation between the gripping surfaces and the chamber to restrict any leakage fluid from coating those surfaces.

The dust shield preferably has a plurality of radical slits extending from a center to provide a plurality of resilient fingers which are deflected by the assembly during insertion yet provide additional gripping surfaces longitudinally along the assembly.

Several advantages result from the protective holder. Dust and other material have limited access to the interior of the holder. A resilient stop member provides a cover for at least a portion of the sealing surfaces of the check valve. Preferably the stop also provides an isolation of the ball from the gripping surfaces to prevent any leakage fluid from reaching those surfaces. The section adjacent the ball also includes a drain hole to permit drainage of any leakage fluid. The dust shield is formed to provide additional gripping surfaces to retain the assembly in the holder.

A BRIEF DESCRIPTION OF THE DRAWINGS

A DETAILED DESCRIPTION OF THE INVENTION

The invention is directed to a protective holder for hose tip assemblies used to releaseably connect a variety of fluid transfer systems. The holder is particularly adapted for hose tip assemblies associated with hydraulic systems including those with fluid sealing valve members such as check valves. In general these valve members include fastening members for connection to mating fastening members on the mating coupling member and sealing surfaces to provide a pressure tight connection.

Typically, the tip assembly will include a check valve actuated by a ball with outer surfaces adjacent the ball having surfaces tapering inwardly toward the ball to provide sealing surfaces when a mating member is connected to the valve. Away from the valve towards the hose, the assembly includes a swivel and coupler to provide a quick disconnect coupling action.

The holder of this invention is adapted to telescope over the tip assembly to provide protection to the tip. At its entry end leading to a hollow tubular interior, the holder has a dust shield normally closed but moveable inwardly in a longitudinal direction to permit insertion of the tip assembly. At the opposite or valve end, a drain hole is provided for drainage of any leakage fluid from the ball. Adjacent the drain hole and the associated chamber for the ball is provided a resilient stop member with surfaces to limit the entry of the tip assembly.

Preferably, the stop provides a resilient cushion for the sealing surfaces and restricts access of any leakage fluid to the gripping surfaces.

Figure 1:
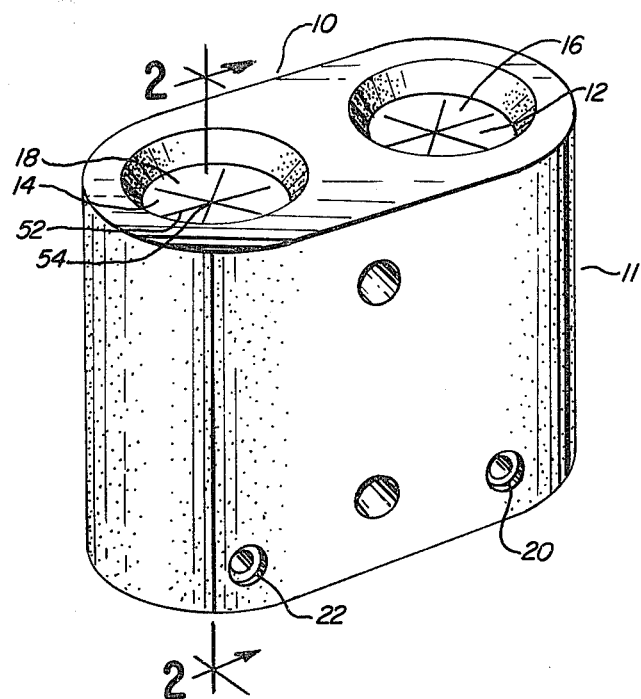
FIG. 1 is a perspective view of a protective holder as one embodiment of the invention.
Figure 2:
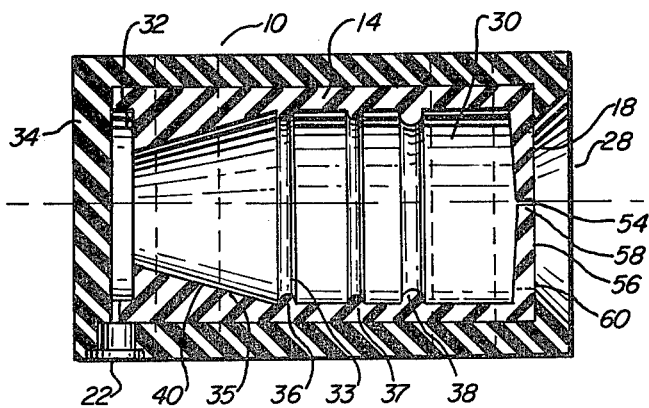
FIG. 2 is a side view with portions cut away of the holder of FIG. 1.
Figure 3:
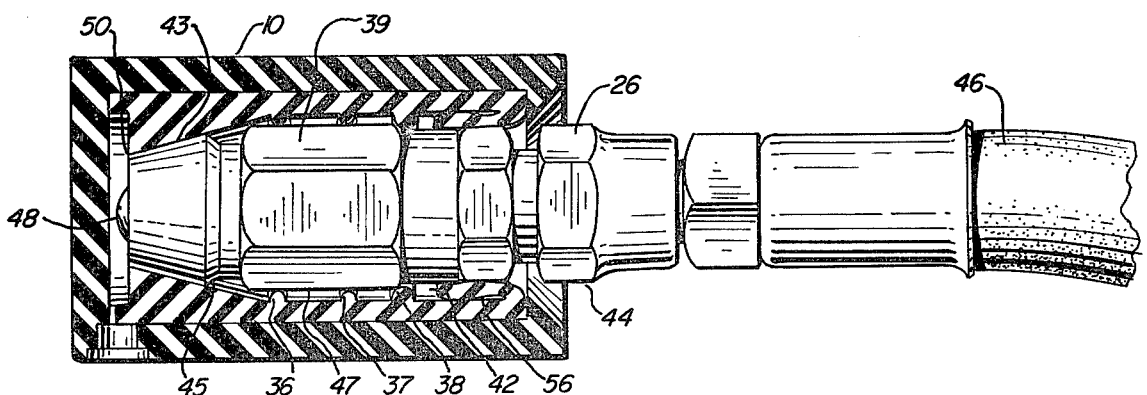
FIG. 3 is a side view with portions cut away of FIG. 1 with a hose tip assembly inserted in the holder.

FIGS. 1-3 illustrate a holder of this invention and its use with a typical hose tip assembly. As illustrated in FIG. 1, the holder 10 includes an outer housing 11 with inner housings 12 and 14 as identified by their dust shields 16 and 18. Drain holes 20 and 22 permit drainage of leakage fluid from within the respective valve chambers. Preferably, the outer housing 11 and inner housings 12 and 14 are molded of a resilient material such as an EPD rubber.

As illustrated in FIGS. 2-3, the dust shield 18 at entry end 28 leads to a hollow tubular interior 30 with a valve chamber 32 adjacent valve end 34. Drain hole 22 is provided for drainage of leakage fluid. Intermediate ends 28 and 34 are provided a plurality of gripping surfaces illustrated by protruding flexible ridges 36-38 in a second chamber 33. A stop member 35 is provided adjacent the valve chamber 32 and includes generally round surfaces 40 tapering inwardly to provide a resilient cushion for the sealing surfaces 43 on the valve 39. The engagement between surfaces 40 of the stop member and surfaces 43 on the valve further provides isolation between the chamber 32 and the gripping surfaces 36-38 in chamber 33.

As illustrated, the tip assembly 26 includes valve 39, coupler 42 and swivel 44 connected to hose 46. A ball 48 is provided at the end 50 of the assembly, and is moveable inwardly during connection with a mating member to permit flow of hydraulic fluid. Valve 39 further includes tapered surfaces 43 for sealing engagement with the mating member and shoulder 45 for retention of the mating member. Outer surfaces 47 of valve 39 are engaged by gripping surfaces 36-38 as illustrated in FIG. 3. A small amount of leakage fluid may be present on the ball after removal from the mating member and conveniently drains through drain hole 22.

The dust shield 18 is further constructed with a plurality of radial slits 52 extending outwardly from a center 54 and are tapered inwardly in thickness towards the center to provide flexible fingers 56. These fingers are normally closed but may be moved inwardly towards end 34 to permit entry of the hose tip assembly. As illustrated, these fingers 56 are tapered in thickness to provide a thinner deflectable end 58 with a thicker hinge section 60 to cause the fingers to return to their normally closed position after the assembly is removed.

As illustrated in FIG. 2, the inner housings are retained in the outer housing by shoulder 54. The construction of inner and outer housings permits easier molding of the parts and the use of inner housings which may accomodate a number of tip assemblies.

As described herein, the holder is adapted for storing in a hose tip assembly when disconnected from a mating connecting member and comprises a hollow interior defined by interior surfaces for receiving the assembly, an entry end exposing the interior and having a dust shield in a normally closed position over the opening but moveable inwardly, by insertion of the assembly, and a closed end opposite the entry end. The interior extends longitudinally between the ends with the interior surfaces providing stop means limiting insertion of the assembly to a stop position, a first chamber between the stop means and closed end, and a second chamber exposing a plurality of resilient gripping surfaces between the stop means and entry end for releaseably gripping the assembly in the stop position.

As illustrated, the stop means includes means for isolating the first and second chambers to restrict the transfer of any leakage fluid to the second chamber. A drain opening is provided to the first chamber for draining any fluid. When the assembly includes sealing surfaces, the stop means preferably includes surfaces engaging those sealing surfaces. Preferably, the dust shield is radially slit to form a plurality of resilient fingers to flex inwardly when the assembly is inserted. Mounting means are provided for mounting the assembly to a support.

The embodiments of the invention in which an exclusive property or privilege is claimed are defined as follows:

1. A protective holder for storing a hose tip assembly when disconnected from a mating connecting member, comprising
    a housing including interior surfaces defining a hollow interior for receiving the assembly,
    an entry end with an opening permitting access to the interior and with a dust shield in a normally closed position over the opening but moveable inwardly by insertion of the assembly, and
    a closed end opposite the entry end, the interior extending longitudinally between the ends, the interior surfaces forming resilient stop means limiting insertion of the assembly to a stop position, a first chamber between the stop means and closed end, and a second chamber exposing a plurality of resilient gripping surfaces between the stop means and entry end for releaseably gripping the assembly in the stop position.

2. The holder of claim 1 wherein the stop means includes means for isolating the first and second chambers.

3. The holder of claim 2 including a drain opening from the first chamber to the exterior of the housing.

4. The holder of claim 2 wherein the tip assembly includes sealing surfaces for engagement with corresponding surfaces of the mating member and wherein the stop means includes interior surfaces resiliently engaging the sealing surfaces.

5. The holder of claim 2 wherein the dust shield includes a center and a plurality of radial slits from the center forming a plurality of flexible fingers.

6. The holder of claim 5 wherein the fingers are deflected by insertion of the assembly and releaseably grip the assembly in the stop position.

7. The holder of claim 6 wherein the fingers have a thickness decreasing towards the center.

8. The holder of claim 2 wherein said housing is constructed of inner and outer members telescoped together to form said housing.

9. The holder of claim 4 including a drain opening from the first chamber to the exterior of the housing.

10. The holder of claim 9 wherein the dust shield includes a center and a plurality of radial slits from the center forming a plurality of flexible fingers.

* * * * *